United States Patent [19]

Schulze

[11] Patent Number: 4,835,643
[45] Date of Patent: May 30, 1989

[54] DISK DRIVE HEAD ACTUATOR COIL

[75] Inventor: Dieter M. Schulze, Saratoga, Calif.

[73] Assignee: Microscience International Corporation, Sunnyvale, Calif.

[21] Appl. No.: 51,988

[22] Filed: May 19, 1987

[51] Int. Cl.⁴ .......................... G11B 5/55; G11B 21/08
[52] U.S. Cl. ...................................... 360/106; 310/27; 360/98.01; 360/78.12
[58] Field of Search ........................ 360/106, 104–105, 360/97, 99; 310/12, 13, 27

[56] References Cited

U.S. PATENT DOCUMENTS

| | | | |
|---|---|---|---|
| 1,396,337 | 11/1921 | McDonald | 310/21 |
| 2,559,602 | 7/1951 | Denman | 310/21 |
| 2,766,407 | 10/1956 | Sanford | 335/213 |
| 3,688,035 | 8/1972 | Cless | 310/13 |
| 3,735,162 | 5/1973 | Alth | 310/13 |
| 4,306,259 | 12/1981 | Saito et al. | 360/99 |
| 4,476,404 | 10/1984 | Bygdnes | 360/106 |
| 4,533,183 | 11/1985 | Brown et al. | 360/98 |
| 4,544,972 | 10/1985 | Kogure et al. | 360/106 X |
| 4,620,252 | 10/1986 | Bauch et al. | 360/106 |

FOREIGN PATENT DOCUMENTS 0113653 6/1985 Japan ...................... 310/12

Primary Examiner—Stuart N. Hecker
Assistant Examiner—David J. Severin
Attorney, Agent, or Firm—Townsend and Townsend

[57] ABSTRACT

An improved voice coil actuator for a head arm assembly. The portions of the voice coil which do not pass between the permanent magnets, and thus form a return path for the current, are bent substantially perpendicular to the remainder of the coil. One of these perpendicular portions is fixed to the head arm assembly by bonding or otherwise. The perpendicular arrangement of the return portion of the coil does not effect the coil's performance because this portion does not pass between the permanent magnets and thus is not involved in generating the force which moves the head arm assembly. Such an arrangement causes the voice coil to take up less room, allowing it to be placed closer the edge of the disk drive housing.

7 Claims, 2 Drawing Sheets

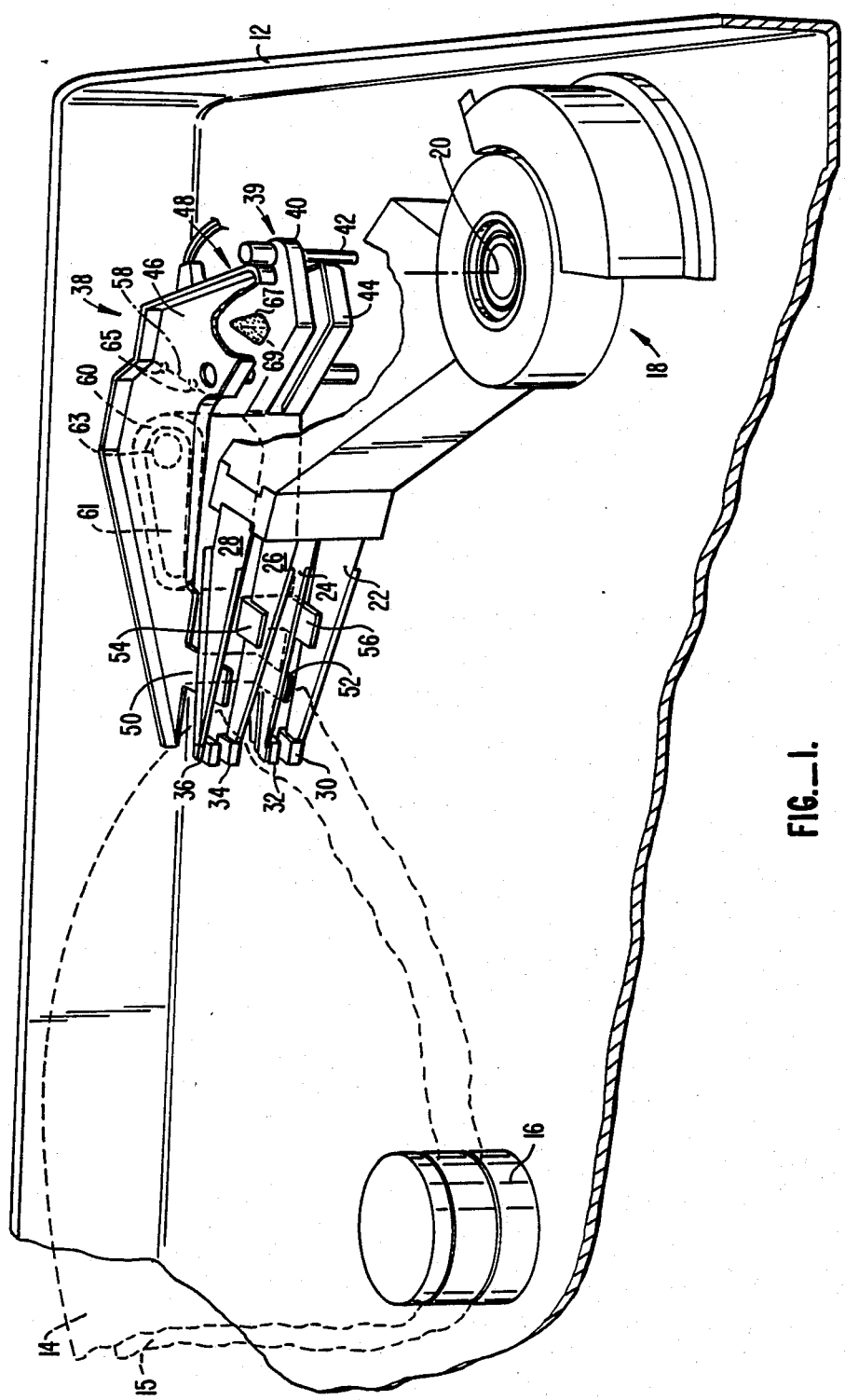
FIG._1.

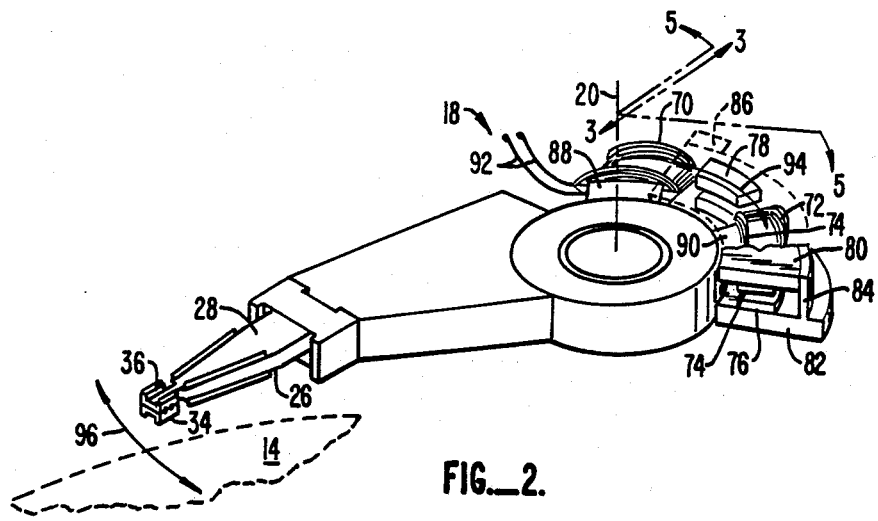
FIG._2.
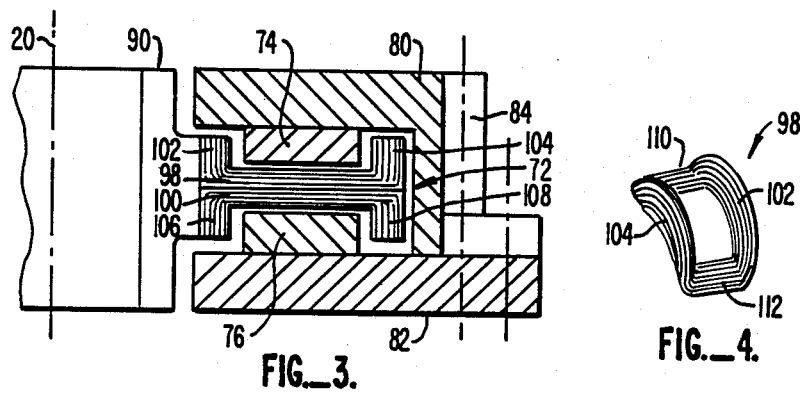
FIG._3.
FIG._4.
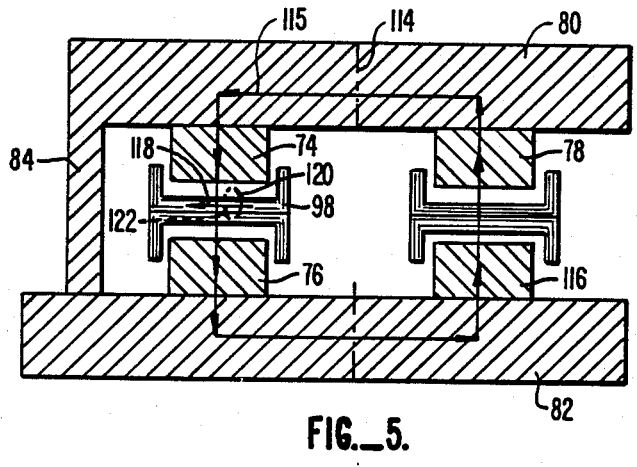
FIG._5.

DISK DRIVE HEAD ACTUATOR COIL

BACKGROUND

The present invention relates to voice coils used to actuate a head arm assembly in a hard disk drive.

Hard disk drives typically have a head arm assembly which rotates about a pivot axis to extend multiple heads to a stack of disks. The stack of disks are spun about a spindle between the heads. The rotation of the head arm assembly to extend the heads into the disk area is typically done using a voice coil and permanent magnets. The voice coil is a flat loop containing numerous windings of a wire. The voice coil is connected to the head arm assembly and is located between permanent magnets which are mounted above and below the voice coil and connected to the disk drive housing. When a current is forced through the wires of the voice coil, a magnetic field is generated which interacts with the magnetic field of the magnets to cause a force to be exerted on the voice coil. This force causes the voice coil to move, thereby causing the head arm assembly to rotate around its pivot axis.

The voice coil is coupled to the head arm assembly, rather than the permanent magnets being coupled to the head arm assembly, because such a voice coil typically has less weight than the permanent magnets. The smaller weight reduces the inertia of the head arm assembly, thus requiring less force to rotate it. As disk drives have become smaller and smaller, it has become more important to miniaturize components, resulting in a number of tradeoffs. For instance, the force exerted by the voice coil is proportional to the number of turns of the coil. However, a larger number of turns not only adds to the inertia of the head arm assembly, also requires more space for the voice coil. It is possible to get the same force with a smaller voice coil by using a higher quality permanent magnet, such as a neodymium type magnet rather than ceramic magnetic. Such a neodymium type magnet will produce a stronger magnetic force.

SUMMARY OF THE INVENTION

The present invention is directed to an improved voice coil actuator for a head arm assembly. The portions of the voice coil which do not pass between the permanent magnets, and thus form a return path for the current, are bent substantially perpendicular to the remainder of the coil. One of these perpendicular portions is fixed to the head arm assembly by bonding or otherwise.

The perpendicular arrangement of the return portion of the coil does not effect the coil's performance because this portion does not pass between the permanent magnets and thus is not involved in generating the force which moves the head arm assembly. Such an arrangement causes the voice coil to take up less room, allowing it to be placed closer to the edge of the disk drive housing. Vertical space to accommodate the perpendicular portion of the voice coil is present adjacent to the sides of the permanent magnet which extend downward or upward towards the voice coil. The perpendicular arrangement also reduces the average distance from the mass of the voice coil from the pivot axis of the head arm assembly, thereby reducing the inertia of the voice coil. In addition, the perpendicular portion bonded to the head arm assembly provides a larger surface for heat transfer than the narrow edge of a voice coil of the prior art.

In one embodiment, a pair of such bent voice coils are attached back-to-back, with one being curved around an upper permanent magnet and the other being curved around a lower permanent magnet. Alternately, a single coil could be used. Two sets of such upper and lower permanent magnets are used to provide a loop for the magnetic flux through the permanent magnets. The two top magnets are joined together by an iron plate, as are the two bottom magnets, to form a path for the magnetic flux.

The bent shape of the coil gives it more stiffness in the direction of rotation, thus making it less susceptible to vibrations. Without such a bent shape, a voice coils is susceptible to vibrations when the frequency of narmonics of the current supplied to the coil approaches a natural frequency or the coil.

For a fuller understanding of the nature and advantages of the invention, reference should be made to the ensuing description taken in conjunction with the accompanying drawings.

BRIEF DESCRIPTION OF THE DRAWINGS

FIG. 1 is a perspective view, partially broken away, of an embodiment of a disk drive having a head arm assembly with a voice coil according to the present invention;

FIG. 2 is a perspective view of a portion of the head arm assembly of FIG. 1;

FIG. 3 is a sectional view through the coil of FIG. 2 along lines 3—3;

FIG. 4 is a perspective view of a voice coil according to the present invention; and FIG. 5 is a graphical representation of a section through the head arm assembly of FIG. 2 along lines 5—5 showing the magnetic flux path.

DETAILED DESCRIPTION OF THE PREFERRED EMBODIMENTS

FIG. 1 shows a disk drive housing 12 with a of pair disks 14, 15 (shown in phantom). Disks 14 and 15 are mounted on a spindle 16. A head arm assembly 18 rotates about an axis 20 to swing head arms 22, 24, 26 and 28 with associated heads 30, 32, 34 and 36, into and out of the disk stack of disks 14 and 15. A head lifter mechanism 38 is used to separate the heads from the disks, but is not related to the present invention.

FIG. 2 shows a portion of head arm assembly 18 of FIG. 1 in more detail. Two pairs of voice coils 70 and 72 are shown. In a preferred embodiment, only one of voice coils 70 and 72 is used. Also, each coil pair may be wound as a single coil. Voice coil pair 72 passes between a pair of permanent magnets 74 and 76. A top magnet 78 of a second pair of magnets is also shown. Upper magnets 74 and 78 are joined together with a iron plate 80 (partially broken-away). A similar iron plate 82 couples together permanent magnet 76 and another permanent magnet below magnet 78 (not shown). Plates 80 and 82 are spaced apart by a pair of struts 84 and 86. Coil pairs 70 and 72 are glued to aluminum projections 88 and 90 of head arm assembly 18. A pair of flex wires 92 provide the electrical connection to one of voice coils 70. The other voice coils are electrically connected in series. When current is applied, the interaction of the magnetic field generated by the voice coils with the magnetic field generated by the permanent magnets causes voice coils 70 and 72 to move in the direction indicated by arrow 94, thereby causing head arm assembly 18 to rotate about pivot 20. The rotation of head arm assembly 18 moves heads 36 and 34 in the direction indicated by arrow 96.

FIG. 3 shows a sectional view along lines 3—3 of the FIG. 2. Coil pair 72 contains two coils 98 and 100 which are mounted back-to-back with perpendicular portions 102 and 104 of coil 98 being bent around permanent magnetic 74 while perpendicular portions 106 and 108 of coil 100 are bent around permanent magnet 76. As can be seen, the perpendicular portions of the coils take advantage of the vertical spaces which already exist due to the need for magnets 74 and 76 to project below and above iron plates 80 and 82, respectively, to keep flux saturation of the plates low. Coils 98 and 100 could be wound from a single wire to produce a single coil. To obtain a desired resistance through the coil(s), two or more coils could be connected in parallel, and these could in turn be coupled in series with another coil or coils.

A perspective view of voice coil 98 is shown in FIG. 4. Portions 102 and 104 of coil 98 form return paths for the current flowing through the coil, with portions 110 and 112 of the coil carrying current which produces a magnetic field to interact with the magnetic flux between magnets 74 and 76. Since the magnetic field produced by current through portions 102 and 104 does no work, the orientation of these portions of the wires in a perpendicular direction does not affect the essential performance of the voice coil. These portions should be balanced, however, since any imbalance can result in undesirable radial forces. An insert can be added to the center of coil 98 to give added stiffness and augment the natural frequency of the coil. Such an insert also adds weight to balance the pivot arm, which is particularly important for a side-mounted disk drive to act as a balancing weight.

As can be seen from FIG. 3, the distance voice coils 98 and 100 extend outward from pivot 20 is reduced by sections 102, 104, 106 and 108 being bent perpendicular to the remainder of the voice coils. If these sections were horizontal, as in the prior art, the voice coil would extend farther out, requiring support strut 84 to be farther out, requiring more room in the disk drive housing. In addition, portions 102 and 106 of the voice coils provide a larger surface in contact with projection 90, thereby improving heat dissipation. The shorter distance of the coil from pivot 20 also reduces the inertia of the head arm assembly, thus requiring less current to the coils to give the same dynamic rotational force. Alternately, the same current could be used, but with a lower quality magnet for permanent magnets 74 and 76, thus reducing costs.

FIG. 5 shows the direction of the magnetic flux through the permanent magnets. FIG. 5 is a graphical view which is a sectional view shown in FIG. 3 plus another section to the right of line 114 which shows a section through permanent magnet 78. This second section is actually at an angle to the first section, rather than being in the same plane as depicted graphically in FIG. 5. The flux path is shown by arrows 115 passing downward through permanent magnets 74 and 76, across through plate 82, up through permanent magnets 116 and 78, and finally back across through upper plate 80. Arrow 118 shows the direction of current through coil 98 on one side of the coil. Arrows 120 and 122 show the direction of the magnetic field generated by current 118. This magnetic field is directed upward on the close side of arrow 18 and is directed downward on the far side of arrow 118. The magnetic field of arrow 120 opposes the flux through the permanent magnets while the magnetic field of arrow 122 adds to the flux of the magnets. Thus, there is a greater force on the one side of the coil than the other, causing the coil to move out or the page due to the interaction of the magnetic fields when current is applied in the direction of arrow 118 through coil 98. When current on the other side of the coil flows in the opposite direction between magnets 78 and 116, a force in the same direction is generated.

Support strut 84 could form an alternate path for the magnetic flux through permanent magnet 74 and 76, thus shunting the flux through permanent magnet 78 and 116. Thus, this strut could be made of aluminum or some other nonmagnetic conducting material. However, in practice, this shunting effect is not noticeable, and thus iron or steel struts could be used.

The structure of the voice coil, as shown in FIG. 4, is also stiffer than a prior art coil, in which portions 102 and 104 would be in the same plane as portions 110 and 112. Any force which would attempt to bend portion 110 towards portion 112 or vice-versa would be opposed by perpendicular portions 102 and 104, thus adding stiffness. If portions 102 and 104 were flat, it would be easy for the voice coil to be bent in this direction.

As will be understood by those familiar with the art, the present invention may be embodied in other specific forms without departing from the spirit or essential characteristics thereof. For example, either a single voice coil or a pair of voice coils could be used. Alternately, two single voice coils could be used in side by side relationship, and the coils could be connected in parallel or in series or combinations thereof. Accordingly, the disclosure of the preferred embodiments of the invention is intended to be illustrative, but not limiting, of the scope of the invention which is set forth in the following claims.

What is claimed is:

1. An improved disk drive apparatus having a housing, at least one disk and at least one head connected to a head arm assembly which rotates around a pivot axis to move said at least one head across said at least one disk, the improvement comprising:

a first curved actuator magnet coupled to said housing proximate an inside wall of said housing, said first actuator magnet being curved about said pivot axis;

a first wire coil attached to said head arm assembly, said coil having first, second third and fourth portions forming a loop proximate said first actuator magnet, said first and third portions being in a plane perpendicular to said pivot axis, said second portion being between said first actuator magnet and said pivot axis, said fourth portion being between said first actuator magnet and said inside wall of said housing, said second and fourth portions being bent to extend substantially perpendicularly to said first and third portions, said fourth portion of said coil having sufficient width so that if bent toward said plane containing said first and third portions said fourth portion would contact said inside wall of said housing before reaching said plane, said second portion of said coil being bonded along a vertical surface to said head arm assembly, said coil being curved with the same curvature as said first curved actuator magnet and a gap between said second and fourth portions and said plane of said first and third portions being less than a width of said second and fourth portions;

a second actuator magnet mounted in said housing below said first coil; and a second coil substantially identical to said first coil with second and fourth portions extending vertically downward, said second coil being between said first coil and said second actuator magnet, said first actuator magnet being above said first coil, said second and fourth portions of said first coil extending upward from said first and third portions of said first coil.

2. The apparatus of claim 1 wherein said first and second coils are formed from a single wire.

3. The apparatus of claim 1 wherein said coils are electrically coupled in parallel.

4. The apparatus of claim 1 wherein said coils are electrically coupled in series.

5. The apparatus of claim 1 wherein said coils are electrically coupled in a combination of in parallel and in series.

6. The apparatus of claim 1 further comprising third and fourth actuator magnets mounted to said housing at positions above and below, respectively, a path of said first and third portions of said coils when said head arm assembly is rotated.

7. The apparatus of claim 6 further comprising:
a first iron plate coupling said first and third actuator magnets;
a second iron plate coupling said second and fourth actuator magnets; and
at least one support strut coupling said first plate to said second plate.

* * * * *